Jan. 22, 1957     I. J. NOVAK     2,778,763

PRODUCTION OF COMPOSITE GLASS AND ASBESTOS YARN

Filed Jan. 18, 1954

Inventor:
Izador J. Novak
By Gary, Desmond & Parker
Attys.

United States Patent Office 2,778,763
Patented Jan. 22, 1957

2,778,763

PRODUCTION OF COMPOSITE GLASS AND ASBESTOS YARN

Izador J. Novak, Trumbull, Conn., assignor to Raybestos-Manhattan, Inc., Passaic, N. J., a corporation of New Jersey Application January 18, 1954, Serial No. 404,791

2 Claims. (Cl. 154—91)

This invention relates to the production of novel composites of glass fibers and asbestos fibers, and more particularly to the production of fiber glass yarn of new and improved character comprised of glass filaments and fine chrysotile asbestos fibers, wherein the glass filaments are coated with and spaced apart by dry residue of a liquid dispersion of chrysotile asbestos fibers principally of colloidal diameter, i. e. discrete asbestos fibers of from about .02 to about .05 microns in diameter, termed herein "unit" fibers.

Individual fine glass filaments which are drawn from a glass melt and then combined in large multiples to form the continuous filament yarn or the shorter lengths used to produce the staple glass fiber yarn of commerce, are now generally coated with a lubricant size for weaving or a plastic acceptor coating for plastics reinforcement. Practically none is left unsized or uncoated, because of the very abrasive character of a glass surface in contact with another glass surface. However, the present sizing materials do not completely protect the filaments in a glass yarn from destroying each other under bending, twisting, vibration or other stress. Since the original high strength of continuous filament glass yarn is so easily reduced by abrasion within itself, causing breakage of individual filaments, it has been a disappointment in many cases where even mild intermittent distortion within the yarn occurs.

Furthermore, because of this same characteristic, which allows very little twist to be inserted in such yarn, as well as the high modulus of glass, yarns of this material have very low extensibility before breakage, and are therefore much more subject to breakage by shock than other yarns.

Again, because of its very nature, glass yarn when heated changes to a liquid at temperatures depending on its composition, usually becoming fluid at between 1200° F. and 1600° F. This is very undesirable when flame temperatures are encountered during use, as its separating and spacing qualities disappear and its strength drops to nothing. This is particularly true of its important use as electrical insulation.

I am aware of previous attempts to overcome this well and long known set of characteristics of straight glass filament yarn by the inclusion therewith of asbestos fiber such as, for example, United States Patent No. 2,132,702 to Donald C. Simpson which describes a combination of glass filaments and asbestos fiber. However, the asbestos fiber there used is the dry milled or milled and carded asbestos of commerce which bears roughly the same shape and size relation to the unit asbestos fibers that trees or shrubs or a brush pile might bear to the alpha cellulose fibers made from them. This kind of cushioning has not been adequate to correct the difficulty, not only because of great size variability of the asbestos fiber with respect to the glass fiber, but also because of granular impurities such as sand and magnetite of variable size which are associated with even ordinary high grade dry asbestos fiber.

Also pressure, application of which brings glass filament surfaces into direct contact, as in molding operations, will cause unexpected reduction in over-all strength because of the same harsh glass-to-glass contact.

I have now discovered a method of safely reducing or eliminating this harsh and destructive contact, by interposing between the glass filaments a cushion or mat of the very fine diameter chrysotile asbestos fibers of the character hereinbefore described, to produce smooth, uniform diameter yarn of improved physical properties.

The relative diameters of these two fibers are widely separated, allowing the fine chrysotile fibers to act as a matting between the much large diameter glass fibers. Drawn glass fiber for yarn runs from about 1 micron to 10 microns in diameter, while naturally occurring chrysotile fiber in unitary form is from about .02 to about .05 microns in diameter. Hence the latter is well adapted to form a protective mat or cushion for the former, when first adequately separated into single fibers and then applied to the glass fiber.

The accompanying drawings diagrammatically illustrate the product of the present invention and an arrangement of apparatus for carrying out the method of producing same.

Figure 1:
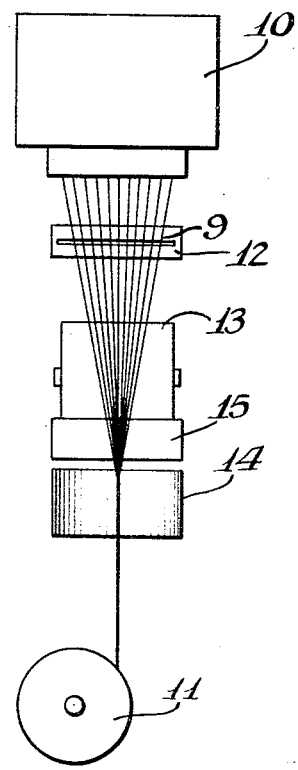
Fig. 1 is a schematic front elevational view of apparatus for attenuating a multiplicity of fine glass fibers, applying thereto a liquid dispersion of unit chrysotile asbestos fibers, and grouping the coated fibers into a strand, roving or yarn.
Figure 2:
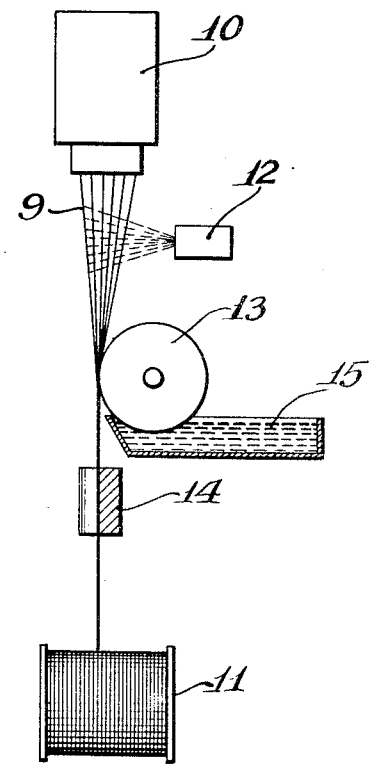
Fig. 2 is a side elevational view of the apparatus of Fig. 1 with parts in section.

In the manufacture of continuous filament glass yarn, glass of suitable composition is melted in a supply tank and from the bottom of this tank, through a large number of openings in a spinneret 10 (about 200) glass filaments 9 are drawn downward simultaneously by means of a very rapid winder or take-up device, usually a rotating mandrel 11. At the bushing or spinneret they may be spaced apart about ½". After rapid cooling and solidification by air or water spray 12 they may be brought into contact with the face of a liquid applicator roll or pad 13 while still separated, which by previous practice applies a lubricant or other adherent liquid sizing or coating. The continuous fiber glass filaments are then condensed at a shoe 14 which brings them all together into a "roving" just before they are wound up on the take-up mandrel 11. The liquid sizing may also be applied just above the shoe by merely pouring it downward on the roving just before the filaments arrive at the condensing shoe, although the wetting is not as thorough here as when the filaments are more widely separated. The package of wet roving wound on a paper core on the mandrel is removed and placed in an oven to dry off the water before rewinding on spools.

In accordance with the present invention I apply to the glass filaments while they are still spread apart, a liquid dispersion of asbestos fibers 15 predominantly of unit diameter as hereinbefore described, at a point intermediate the aforesaid spinneret and condensing shoe. This may be accomplished by spraying or flowing the asbestos dispersion onto the spaced glass filaments 9, and preferably by means of applicator roll 13 supplied by a suitable fountain, projecting into the path of and against the downwardly moving continuous filaments 9 so as to cause the filaments to contact the face of the applicator roll while still separated.

Figure 3:
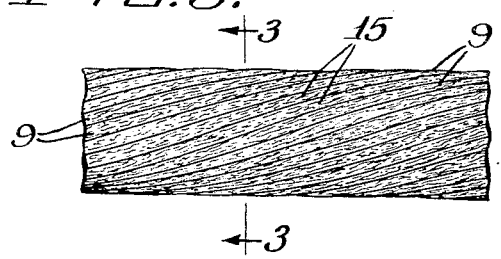
Fig. 3 is an enlarged, diagrammatic, fragmentary side elevational view of the roving or yarn of the present invention composed of a multiplicity of glass filaments, the glass filaments being in a matrix of unit chrysotile asbestos fibers, said asbestos fibers lying wholly exteriorly of the bodies of and as surface coatings on said component filaments.
Figure 4:
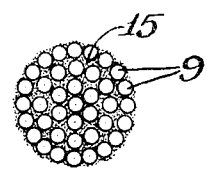
Fig. 4 is a section on the line 3—3 of Fig. 4.

When the asbestos dispersion wetted filaments are then condensed against the condensing shoe 14, the asbestos fiber is locked in between the glass filaments 9, and the asbestos impregnated glass roving is then wound on the pick-up mandrel 11. After drying off the liquid, the asbestos fiber remains as a fine, smooth, adherent internal cushion and filling between and around the glass filaments as diagrammatically shown in Figs. 3 and 4. Rewinding produces an asbestos impregnated glass roving. The term "roving" is intended to mean a multiple of filaments in which no additional twist has been applied beyond the very slight twist developed during winding or unwinding. Further twist may be applied on standard yarn spinning frames to produce a yarn. This combination of fine asbestos and glass filament will safely take and hold more twist than an all glass filament roving because of the internal asbestos cushion. Since more twist allows more stretch, a more resilient and shock resistant yarn may be produced.

While various methods of providing a liquid flowable dispersion of asbestos fibers characterized by unit fiber content are known, such as for example the mechanical subdivision and chemical dispersion of Barbaras United States Patent 2,661,287, I prefer to employ a colloidal dispersion of asbestos such as that prepared in accordance with the teachings of my United States Patent 2,626,213, since the latter provides a dispersion wherein the chrysotile asbestos fibers are not only predominantly of unit size or colloidal diameter, but in addition are chemically dispersed in the form of a colloidal dispersion by means of organic chrysotile asbestos colloidizing agent. The use of the latter, which stated another way, may be termed a colloidal dispersion of principally unit or colloidal diameter asbestos fibers, permits greater ease of handling, a more uniformly fluid and stably suspended dispersion of the unit asbestos fibers, and better end results.

As an example of the latter system, I may employ a smooth 1% colloidal asbestos dispersion produced by combining by weight 985 parts water, 5 parts Aerosol OT (dioctyl sodium sulfosuccinate), and 10 parts clean chrysotile asbestos milled fiber, by using suitable mixing, screening, and cleaning methods. This may be used directly on the applicator roll, or further diluted with water to provide a greater or lesser residual asbestos fiber content in the composite glass yarn. The asbestos content in the composite yarn may be varied from 5% asbestos to 85% asbestos by varying the concentration of the asbestos in the treating liquid. Also the thickness of the glass filament may be varied by known method; for example, changing the take-up speed, from say 1 micron to 10 microns or more, and this also controls the relative asbestos content. A considerable amount of the asbestos liquid will be thrown off at the rapidly revolving mandrel so that the exact proportions of asbestos to glass filament will depend on the running conditions, but as above indicated may be controlled for any set of conditions by varying the concentration of asbestos in the liquid at application.

The use of longer asbestos fibers will increase the retention by their locking effect but the yarn will be somewhat rougher than if shorter fibers are used. For this purpose I prefer the grade between spinning and paper fiber, called single grade of Canadian #4. When properly cleaned this provides a good compromise between the very short and more dense packing paper fibers and the bulkier spinning fibers, particularly on the finer cuts of glass yarn.

The use of cleaned fiber substantially free from granular or splint impurities such as sand, magnetite, or oversize splints of unopened asbestos is essential to this process. It will be evident that any proportion of hard particles of the same size as the glass filament diameter or layer within the multiple of filaments would inevitably scratch and break the filaments as they are being flexed in further operations or use, and they must therefore be substantially absent from an asbestos dispersion used to produce satisfactory asbestos-glass filament yarn or at least much smaller in size than the filament diameter. Cleaning may be accomplished on the dispersed asbestos slurry by screening, centrifugal separation, magnetic removal of magnetite, or flotation processes on the asbestos before dispersion. I mention this cleaning specifically because the milled asbestos of commerce ordinarily carries from 3 to 8% of unopenable splints and granular nonasbestos impurities of intolerable sizes and is therefore unsuitable for use with continuous filament yarn without the adequate cleaning specified.

In order to obtain a very smooth application of the colloidal dispersed asbestos, I may prepare a colloidal dispersion which has more spreadable properties than the aqueous dispersion described above. This is made, for example, by first combining 985 parts by weight toluene, 5 parts Aerosol OT, and 10 parts clean asbestos fiber, and mixing thoroughly. An equal quantity of water is added slowly while mixing. A mixed phase dispersion is obtained with colloidal asbestos mainly in the interface which has particularly good homogeneity and spreading qualities, and I prefer this for the very fine filament yarns where the best wetting and distribution of fiber is desirable. The proportions of the various ingredients may be modified for greater or lesser viscosity or asbestos content.

Sizing materials may be incorporated in the asbestos dispersion such as starch, polyvinyl alcohol, carboxy methyl cellulose or the like which are soluble in, or in the case of emulsions such as polyvinyl acetate, or oily lubricants, compatible with the aqueous dispersion, or oil or solvent soluble lubricant or binders such as vegetable oils, silicone oils, linseed oil, rubber, resins, and the like, which can be carried in the solvent phase of the mixed phase dispersion of the previous paragraph. Also other fillers or colors may be incorporated in the asbestos dispersion, which is an excellent carrier for such fillers. For example, pulverulent minerals having a particle size smaller than the diameter of the glass filaments, such as clay, alumina, silica, barytes, whiting, iron oxide, may be included. Coloring materials may be such as ultramarine, colored lakes, etc. Another method of coloring is to dye the asbestos fibers directly, or the yarn containing the asbestos fiber after it has been made. Since the asbestos accepts dyes very readily, while the glass does not, this is a means for producing a dyed "glass" yarn. Fillers nonabrasive to glass are not limited as to size, however. These may include solid or semi-solid particles of vulcanized rubber latex, polyvinyl chloride or esters, polystryrene, polyacrylates, talc, graphite, and the like, which may be used for additional binding or bulking of the yarn.

The melting point of the asbestos glass combination is definitely higher than that of the straight glass yarn. In a muffle held at 1600° F., a standard fiber glass yarn melted down completely, whereas a 50:50 asbestos:glass composite yarn was still intact, although it showed some shrinkage. The more asbestos, the higher the effective fusing point of the combination, although this will depend on the exact type of glass used for the glass filament.

The presence of the asbestos also adds bulk and softness to the yarn which is highly desirable in insulation; for example, in covering wire for coils, where the dead hard character of an all glass insulation increases the danger of damage by shock, and reduces flexibility and resilience. In fabrics also, the combination provides greater softness and better "hand," because a yarn capable of taking a higher twist will have more stretch and pliability.

I have thus produced a composite multiple glass filament-asbestos fiber yarn which is internally cushioned because the glass filaments lie in a matrix of the dried residue of an asbestos dispersion of fine fibers, which can carry more twist, which has a higher heat resistance than an all glass yarn, which can be dyed or colored, which has improved pliability and softness, and is less fragile than an all glass yarn.

Although not fully equivalent, I may employ the same type of system hereinbefore described, with blown staple filament glass yarn. Staple fiber glass filaments are in general formed by drawing molten glass in thin streams through perforated bushings, and as the glass emerges from the tiny holes it is caught by the impact of high pressure steam jets which attenuate it into fibers of various noncontinuous lengths. In accordance with the present invention, these blown fibers may be sprayed with the hereinbefore described liquid dispersions of fine asbestos fibers, the dispersion preferably containing a lubricant for the glass. Yarns made from asbestos coated blown staple filament will have the same general qualities of higher heat resistance, internal cushion, and colorability. Since they are softer and more bulky by construction than continuous filament yarn, their physical properties will be less affected by the asbestos addition. With high asbestos proportion, a yarn having properties similar to commercial asbestos yarn may be produced, using asbestos fibers shorter and cheaper than the present spinning grades.

I claim:

1. A smooth, uniform-diameter fiber glass-asbestos yarn comprised of multiple continuous unmodified fine straight filaments of glass yarn coated and spaced by dry residue of a liquid colloidal dispersion of predominantly unit chrysotile asbestos fibers of from about .02 to about .05 microns in diameter, said asbestos fibers providing a cushioning mat for said glass filaments.

2. In a process of forming composite fiber glass-asbestos yarn of improved physical properties and of smooth character and substantially uniform diameter, the improvement which comprises applying to a plurality of spaced fine glass filaments a fluid stably suspended colloidal dispersion of predominantly unit chrysotile asbestos fibers of from about .02 to about .05 microns in diameter containing organic chrysotile asbestos colloidizing agent, consolidating the resulting coated filaments into a roving, and drying to volatilize liquid content and to leave the asbestos fiber as a fine, smooth, adherent internal cushion and filling between and around the glass filaments.

References Cited in the file of this patent

UNITED STATES PATENTS

| | | |
|---|---|---|
| 2,215,150 | Hannen | Sept. 17, 1940 |
| 2,230,271 | Simpson | Feb. 4, 1941 |
| 2,517,753 | Ximinez et al. | Aug. 8, 1950 |
| 2,626,213 | Novak | Jan. 30, 1953 |
| 2,681,870 | Novak | June 22, 1954 |
| 2,710,275 | Waggoner | June 7, 1955 |